United States Patent Office 3,213,086
Patented Oct. 19, 1965

3,213,086
7-METHYL-Δ⁴-ANDROSTENE COMPOUNDS
Alexander D. Cross, Mexico City, Mexico, assignor to Syntex Corporation, Panama, Panama, a corporation of Panama
No Drawing. Filed Nov. 12, 1963, Ser. No. 323,121
Claims priority, application Mexico, Feb. 28, 1963, 71,076
5 Claims. (Cl. 260—239.55)

This invention relates to novel cyclopentanopolyhydrophenanthrene derivatives and to processes for the preparation thereof.

More particularly, this invention relates to novel 17-tetrahydropyranyl ethers of 7-methyl-Δ⁴-androstenes and 7-methyl-19-nor-Δ⁴-androstenes represented by the general formula:

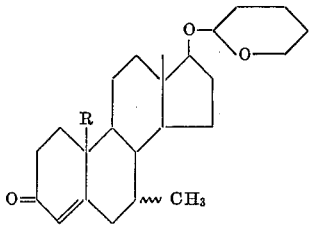

wherein R represents hydrogen or methyl and the symbol ∫ indicates that the methyl group attached at the 7-position of the steroid nucleus can be in either the α- or the β-configuration.

A considerable amount of research in the steroid field has been done in the area of anabolic agents, inasmuch as such compounds are useful in many areas of human and veterinary medicine. Thus, for example, an important application of anabolic agents in human therapy is in cases where the patient suffers from any of a number of debilitating diseases or conditions which produce a negative nitrogen balance, such as deficient nutrition or growth, chronic cachetic diseases, and osteroporosis, wherein it is necessary to increase the metabolism of proteins and obtain a positive nitrogen balance and greater deposition of calcium in bone tissues. Similarly, anabolic agents are extremely useful in the post-operative treatment of patients recovering from major surgical operations.

It is known that androstane derivatives such as testosterone, 19-nortestosterone and various substituted derivatives thereof exhibit good anabolic activity when administered parenterally, and that this is particularly the case with 17α-alkyl substituted derivatives such as 17α-methyltestosterone, 6α,17α-dimethyltestosterone, 2-hydroxymethylene - 17α - methyldihydroallotestosterone, 2α,17α - dimethyl-dihydroallotestosterone, and the like. However, it is also known that androstane derivatives of the type in question which do not have a 17α-alkyl substituent exhibit either very low anabolic activity or no anabolic activity at all when administered orally.

The present invention is based on the surprising and unexpected discovery that the 7-methyl-Δ⁴-androstene and 7-methyl - 19 - nor-Δ⁴-androstene - 17 - tetrahydropyranyl ethers represented by the above general formula, unlike the corresponding 17 - unetherified compounds, exhibit good anabolic activity when administered orally. In addition, the androgenic activity of those 17β-tetrahydropyranyloxy derivatives is low. Thus, when their anabolic/androgenic activity is measured by administering them orally to castrated young male rats and then determining the response to this treatment by increases in the weights of the ventral prostate, seminal vesicles and levator ani muscle, it is found that these 17-tetrahydropyranyl ethers possess very low androgenic activity, while their anabolic activity is markedly greater than that of testosterone.

These novel 17-tetrahydropyranyl ethers also possess anti-estrogenic activity, lower blood cholesterol levels, and inhibit the secretion of gonadotrophins by the pituitary gland.

The 7-methyl-Δ⁴-androstene and 7-methyl-19-nor-Δ⁴-androstene 17-tetrahydropyranyl ethers of the present invention are obtained from the corresponding 17β - hydroxy-steroids by conventional methods of preparing tetrahydropyranyl ethers of steroids having free hydroxyl groups. Thus, the free 17β-hydroxyl-containing parent compound can be reacted, under substantially anhydrous conditions, with an excess of dihydropyran in the presence of a small amount of an acidic catalyst, e.g., hydrochloric acid, p-toluenesulfonic acid, boron trifluoride etherate, and the like, either alone or together with an inert organic solvent, such as benzene, diethyl ether, or the like, at a temperature of from about 0° C. to about 50° C., and preferably at room temperature (about 25° C.), for from about 1 hour to about 72 hours.

These novel compounds can be administered in any of a number of conventional pharmaceutical forms, and particularly in ones suited for oral administration, e.g., in solid form, such as in pills, powders, capsules, tablets, or the like, or in liquid form, as syrups, emulsions, suspensions, and the like.

In order that those skilled in the art can more fully understand the present invention, the following example is set forth. This example is given solely for the purpose of illustrating the invention, and should not be considered as expressing limitations unless so set forth in the appended claims.

Example

To a solution of 1 gram of 7α-methyltestosterone (7α-methyl-Δ⁴-androsten-17β-ol-3-one) in 25 cc. of benzene there was added 2 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 72 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of 7α-methyltestosterone.

By repeating this procedure in every detail but one, namely, replacing 7α-methyltestosterone with 7β-methyltestosterone, 7α-methyl-19-nortestosterone and 7β-methyl-19 - nortestosterone, respectively, the corresponding 17-tetrahydropyranyl ethers, namely, 7β-methyltestosterone 17-tetrahydropyranyl ether, 7α-methyl-19-nortestosterone 17-tetrahydropyranyl ether and 7β-methyl-19-nortestosterone 17-tetrahydropyranyl ether, respectively, were obtained.

I claim:
1. A compound represented by the general formula:

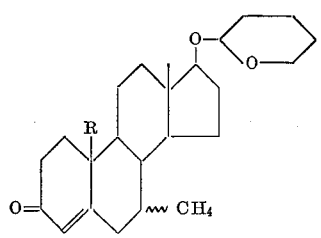

wherein R is selected from the group consisting of hydrogen and methyl.

2. The 17-tetrahydropyranyl ether of 7α-methyltestosterone.
3. The 17-tetrahydropyranyl ether of 7β-methyltestosterone.
4. The 17-tetrahydropyranyl ether of 7α-methyl-19-nortestosterone.
5. The 17-tetrahydropyranyl ether of 7β-methyl-19-nortestosterone.

References Cited by the Examiner

Djerassi et al.: "J. Org. Chem.," vol. 27, No. 4, April 1962, pages 1173–1176.

Ruggieri et al.: "Gazz. Chim. Italy," vol. 91, June 1961, pages 686, 705.

LEWIS GOTTS, *Primary Examiner.*

UNITED STATES PATENT OFFICE
CERTIFICATE OF CORRECTION

Patent No. 3,213,086

October 19, 1965

Alexander D. Cross

It is hereby certified that error appears in the above numbered patent requiring correction and that the said Letters Patent should read as corrected below.

Column 3, lines 7 to 15, the formula should appear as shown below instead of as in the patent:

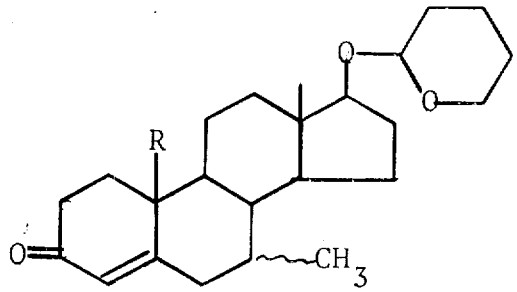

Signed and sealed this 28th day of June 1966.

(SEAL)
Attest:

ERNEST W. SWIDER
Attesting Officer

EDWARD J. BRENNER
Commissioner of Patents